United States Patent
Kwak et al.

(10) Patent No.: US 8,953,879 B2
(45) Date of Patent: Feb. 10, 2015

(54) SYSTEM, METHOD AND MEDIUM PERFORMING COLOR CORRECTION OF DISPLAY IMAGES

(75) Inventors: Young-shin Kwak, Suwon-si (KR); Xiao Kaida, Yongin-si (KR); Du-sik Park, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 1883 days.

(21) Appl. No.: 11/730,693

(22) Filed: Apr. 3, 2007

(65) Prior Publication Data

US 2008/0069439 A1 Mar. 20, 2008

(30) Foreign Application Priority Data

Sep. 18, 2006 (KR) .................. 10-2006-0090274

(51) Int. Cl.
| | |
|---|---|
| G06K 9/00 | (2006.01) |
| G06K 9/40 | (2006.01) |
| H04N 9/64 | (2006.01) |
| G09G 5/02 | (2006.01) |
| G06K 15/00 | (2006.01) |
| H04N 1/40 | (2006.01) |
| G03F 3/08 | (2006.01) |

(Continued)

(52) U.S. Cl.
CPC ............. *H04N 17/02* (2013.01); *H04N 1/6052* (2013.01); *H04N 1/62* (2013.01); *H04N 9/643* (2013.01); *H04N 9/77* (2013.01)
USPC ........... 382/167; 382/162; 382/274; 348/651; 345/591; 345/604; 358/2.1; 358/520

(58) Field of Classification Search
USPC .......... 382/100, 162–167; 348/453, 576–577; 358/1.1, 504, 515–523; 345/581, 345/589–605
See application file for complete search history.

(56) References Cited

U.S. PATENT DOCUMENTS 4,829,455 A * 5/1989 Long et al. .................... 345/632
5,384,601 A * 1/1995 Yamashita et al. ............ 348/577

(Continued)

FOREIGN PATENT DOCUMENTS

| CN | 1410278 A | 4/2003 |
|---|---|---|
| EP | 1301024 A2 | 4/2003 |

(Continued)

OTHER PUBLICATIONS

Japanese Office Action for corresponding Japanese Patent Application No. 10-2006-0090274 dated Sep. 17, 2007 (3 pages).

(Continued)

*Primary Examiner* — Randolph I Chu
*Assistant Examiner* — Nathan Bloom

(57) ABSTRACT

A system, method and medium correcting a display image. The system includes a parameter calculation module to calculate a plurality of parameters required for a transform of a first image, based on a plurality of characteristic differences between the first image and a second image, into which the first image is to be transformed to visually match the second image, a first characteristic transform module to transform a first characteristic of the first image using the plurality of calculated parameters, the transformation resulting in an unrelated change to a second characteristic of the first image, and a second characteristic restoration module to restore the second characteristic changed by the transforming of the first characteristic.

12 Claims, 8 Drawing Sheets

(51) Int. Cl.
*H04N 17/02* (2006.01)
*H04N 1/60* (2006.01)
*H04N 1/62* (2006.01)
*H04N 9/77* (2006.01)

(56) References Cited

U.S. PATENT DOCUMENTS

| | | | |
|---|---|---|---|
| 6,137,903 A * | 10/2000 | Dichter | 382/162 |
| 6,434,266 B1 * | 8/2002 | Kanno et al. | 382/162 |
| 6,463,172 B1 * | 10/2002 | Yoshimura | 382/162 |
| 6,507,667 B1 * | 1/2003 | Hsieh et al. | 382/167 |
| 6,816,610 B1 * | 11/2004 | Beckwith | 382/162 |
| 2003/0063145 A1 * | 4/2003 | Fujita et al. | 347/15 |
| 2003/0068084 A1 * | 4/2003 | Kinjo et al. | 382/164 |
| 2004/0165772 A1 * | 8/2004 | Russell et al. | 382/167 |
| 2005/0047657 A1 * | 3/2005 | Lee | 382/167 |
| 2005/0219260 A1 * | 10/2005 | Satomi et al. | 345/604 |
| 2005/0225785 A1 * | 10/2005 | Hiramatsu | 358/1.9 |
| 2005/0280848 A1 * | 12/2005 | Seko | 358/1.9 |
| 2006/0001928 A1 * | 1/2006 | Hayaishi | 358/518 |
| 2006/0188157 A1 * | 8/2006 | Kondo et al. | 382/167 |
| 2008/0055478 A1 * | 3/2008 | Jaspers | 348/645 |
| 2009/0146989 A1 * | 6/2009 | Hirao | 345/214 |

FOREIGN PATENT DOCUMENTS

| | | |
|---|---|---|
| EP | 1347654 A2 | 9/2003 |
| JP | 3-258091 | 11/1991 |
| JP | 07-262347 | 10/1995 |
| JP | 2001-309399 | 11/2001 |
| KR | 2002-0000976 | 1/2002 |
| KR | 10-2006-0018637 | 3/2006 |
| WO | WO2006/049290 A1 | 5/2006 |

OTHER PUBLICATIONS

Chinese office Action for corresponding Chinese Patent Application No. 2007101038576 dated May 8, 2009 (6 pgs).

European Search Report for corresponding European Patent Application No. EP07108008 dated Nov. 19, 2007 (in English).

* cited by examiner

SYSTEM, METHOD AND MEDIUM PERFORMING COLOR CORRECTION OF DISPLAY IMAGES

CROSS-REFERENCE TO RELATED APPLICATIONS

This application claims priority from Korean Patent Application No. 10-2006-0090274 filed on Sep. 18, 2006 in the Korean Intellectual Property Office, the disclosure of which is incorporated herein by reference in its entirety.

FIELD

One or more embodiments of the present invention relate to a system, method and medium correcting the color of a display image, and more particularly, to a system, method and medium correcting the color of a display image, by which a color similar to a target color is displayed on a conventional display using a simple algorithm, while maintaining maximum brightness and saturation of the currently used display.

DESCRIPTION OF THE RELATED ART

In general, a person may perceive colors differently, even identical colors, due to differing conditions surrounding the color being perceived.

This subjective recognition of a color can turn out to be a difficult aspect of controlling color, and it is highly probable that objective data on color cannot be provided, but rather only subjective information can be transferred.

One method of objectively evaluating color may be to measure frequency bands for all colors, express the results as graphs, and use the graphs. However, there are difficulties in putting this method into practice.

Accordingly, a variety of techniques, such as a color model or a color space, which can identify a color with reference to a predetermined situation, have been developed. Recently, the hue component (hue, H), of an image to be corrected has been changed according to the HSV color model, as a technique for correcting a color in a display image.

However, as the hue component of an image to be corrected in the HSV space is changed, the brightness of the color in addition to the saturation of the color may be changed, and the color output on a monitor may not be displayed in its true desired color.

SUMMARY

One or more embodiments of the present invention provide a system, method and medium correcting the color of a display image, and providing a natural image to a user, in which a color similar to a target color is displayed on a conventional display, while maintaining maximum brightness and saturation on the conventional display.

Additional aspects and/or advantages of the invention will be set forth in part in the description which follows and, in part, will be apparent from the description, or may be learned by practice of the invention.

To achieve at least the above and/or other aspects and advantages, embodiments of the present invention include a system correcting a display image. The system includes a parameter calculation module to calculate a plurality of parameters required for a transform of a first image, based on a plurality of characteristic differences between the first image and a second image, into which the first image is to be transformed to visually match the second image, a first characteristic transform module to transform a first characteristic of the first image using the plurality of calculated parameters, the transformation resulting in an unrelated change to a second characteristic of the first image, and a second characteristic restoration module to restore the second characteristic changed by the transforming of the first characteristic.

To achieve at least the above and/or other aspects and advantages, embodiments of the present invention include a method correcting a display image. The method includes calculating a plurality of parameters required for a transform of a first image, based on a plurality of characteristic differences between the first image and a second image, into which the first image is to be transformed to visually match the second image, transforming a first characteristic of the first image using the plurality of calculated parameters, the transforming of the first characteristic resulting in an unrelated change to a second characteristic of the first image, and restoring the second characteristic changed by the transforming of the first characteristic.

To achieve at least the above and/or other aspects and advantages, embodiments of the present invention include a method changing a first image to match a target image. The method includes transforming a first characteristic of the first image, to visually match the target image, using a plurality of calculated parameters, the transforming resulting in an unintended change to a second characteristic of the first image, and restoring the second characteristic to a value previously held before the unintended change, based on the transformed first characteristic and the plurality of calculated parameters.

BRIEF DESCRIPTION OF THE DRAWINGS

These and/or other aspects and advantages of the invention will become apparent and more readily appreciated from the following description of embodiments, taken in conjunction with the accompanying drawings of which.

DETAILED DESCRIPTION OF EMBODIMENTS

Figure 1:
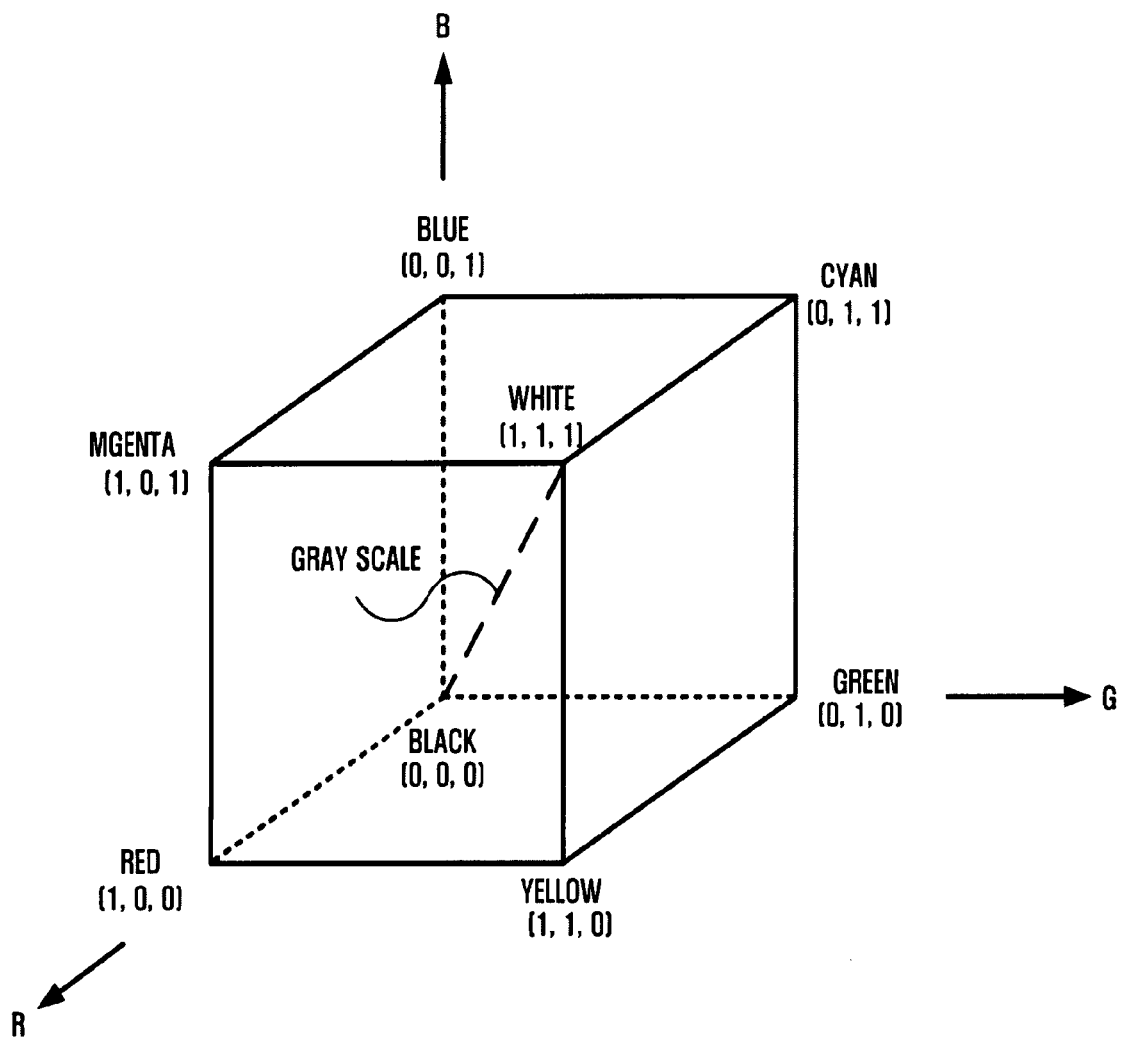
FIG. 1 illustrates a red, green, and blue (RGB) color model.

Reference will now be made in detail to embodiments of the present invention, examples of which are illustrated in the accompanying drawings, wherein like reference numerals refer to like elements throughout. Embodiments are described below to explain the present invention by referring to the figures.

Representative color models such as CIE, CIELab, RGB (Red, Green and Blue), CYM (Cyan, Magenta and Yellow), CMYK (Cyan, Magenta, Yellow, and black), or HSV (Hue, Saturation, and Value for brightness) value models, may be used to describe colors in a specific environment using an objective color evaluating technique. These models may be used for output apparatuses, such as display apparatuses or printers, or used for intuitive color designation by a person. Accordingly, as references thereto will be made in aspects of the present invention, first such color models will be briefly explained.

CIE Color Model and CIELab Color Model

The CIE color model was first developed by the International Commission on Illumination (Commission Internationale de l'Eclairage) in 1931 to specify colors in the visible spectrum using three primary colors.

Since all colors cannot be displayed with three primary colors in a visible region, virtual colors that do not exist are defined with reference to the primary colors in the CIE model.

The CIE color model provides a standard for colors and is convenient for comparing color regions between two difference devices or applications.

For example, if three ink colors of a printer and the color region of the RGB color of a monitor are displayed in the CIE model, it may be determined which colors cannot be output.

Meanwhile, the CIELab color model is designed to reproduce identical colors in different types of monitors or printers or both. The CIELab color model was developed in 1976 based on the CIE model.

The CIELab color model is defined by brightness (Lightness) and two color regions (a and b). The "a" color region is distributed from green to red, and the "b" color region is distributed from blue to yellow.

Here, the region of colors that can be represented by a predetermined color model (RGB, CMYK, etc.) is referred to as a gamut. Since the CIELab color model has a gamut that includes both the CMYK and RGB models, it is used in an intermediate state when a color model is changed in the popular software Photoshop™, for example.

RGB Color Model

The RGB color model is a model based on a tri-stimulus principle of color vision, in which a color is sensed with respect to the degree of excitement of three visual pigments at the retina of our eyes (visual pigments, red, green and blue, in the retina of our eyes have a maximum brightness at a 630 mm wavelength, a 530 mm wavelength, and a 450 mm wavelength, respectively).

In the RGB color model, other colors are represented using references to the three color values, red, green, and blue.

For example, if R=1, G=1, and B=0, that is, (1,1,0), the color becomes yellow.

In the RGB color model, the range of each value, R, G, and B, can be indicated using decimal fractions between 0 and 1, but in most of graphic software programs, values from 0 to 255 are used.

Further, in the RGB color model, the entire range of colors can be represented as a cube, and this is illustrated in FIG. 1. The cube provides a three-dimensional space wherein each possible color occupies a unique position within the cube. Referring to the cube in FIG. 1, the origin (0,0,0) represents the color black, coordinates (1,1,1) represent the color white, and the other corners represent the basic RGB colors and combined colors.

For example, gray scale appears on the line connecting (0,0,0) and (1,1,1). That is, if the three values of R, G, and B are the same, the resulting value becomes a gray scale color.

Many displays, including TVs and computer monitors such as cathode-ray tubes (CRT) and liquid crystal displays (LCD), operate based on the RGB color model.

Inside the monitor screen of the displays, there are electron guns of three colors. Electron beams emitted from these electron guns collide with the fluorescent surface of the insides of color cells of the screen, thereby generating light.

If the three electron guns emit electron beams to a color cell at the same time at maximum intensities, the color will be seen as white. Conversely, if no electron guns emit electron beams, the corresponding point will be seen as black.

In this example, each electron gun emits electron beams in 256-stepped intensities, and the color of one point is generated when the three electron guns emit R, G, and B colors, respectively, to a color cell. Accordingly, 256×256×256 (i.e., over 16 million) different colors can be theoretically displayed on the screen.

This number is far beyond the 400,000 different colors that can be recognized by the unaided human eye, and is generally more than sufficient to represent the world visible to human eyes.

In order to store the color value of one point, a total of 24 bits, including 8 bits for each of R, G, and B are typically required, and this is referred to as "24-bit true color".

Adjusting the contrast of an image is one way to correct color in a display apparatus using the RGB color model.

Here, contrast refers to a difference between gray level values or luminance values in a predetermined area of an image. To adjust the contrast, the contrast is changed using a linear transform such as $g(x,y)=T[f(x,y)]$, or a nonlinear transform T (for example, a log transform), or a histogram equalization method, in which a histogram $h(g)$ of an image is extracted and histograms of higher values and lower values are weakened, thereby providing an image which is smoothed overall.

However, the method of increasing the contrast of an image in the RGB color model may cause distortion of color throughout the entire image.

CMY, CMYK Color Model

The CMY color model has cyan, magenta, and yellow as primary colors, and has a shape obtained by making RGB color models face each other on diagonal lines.

The above RGB color model is based on an additive process, in which the result is white (1,1,1) if three colors, R, G, and B, are added. In contrast, the CMY color model is based on a subtractive process in which the result is black (1,1,1) if three colors, C, M, and Y, are added.

In actuality, if inks of C, M, Y colors are mixed, the result becomes dark gray. If a black ink is used in addition to the C, M and Y, color inks can be saved when a dark color is displayed. Accordingly, for printer output, a CMYK color model is used in which black K is added to the CMY color model. It is typically desirable to use black ink rather than color inks because black ink is much cheaper than color inks. For reference, the CMY color model is mainly used for output colors of a device, such as a printer, in which ink is used to produce a hard copy.

HSV Color Model

The RGB color model and the CMY color model are designed for displays and printing devices, respectively, while the HSV color model is designed to provide a more intuitive color specifying method for a user.

The HSV color model can represent color (hue), saturation, and brightness (value) that cannot be represented in the RGB color model, and is widely used for color correction for displaying natural colors on a display image.

Figure 2:
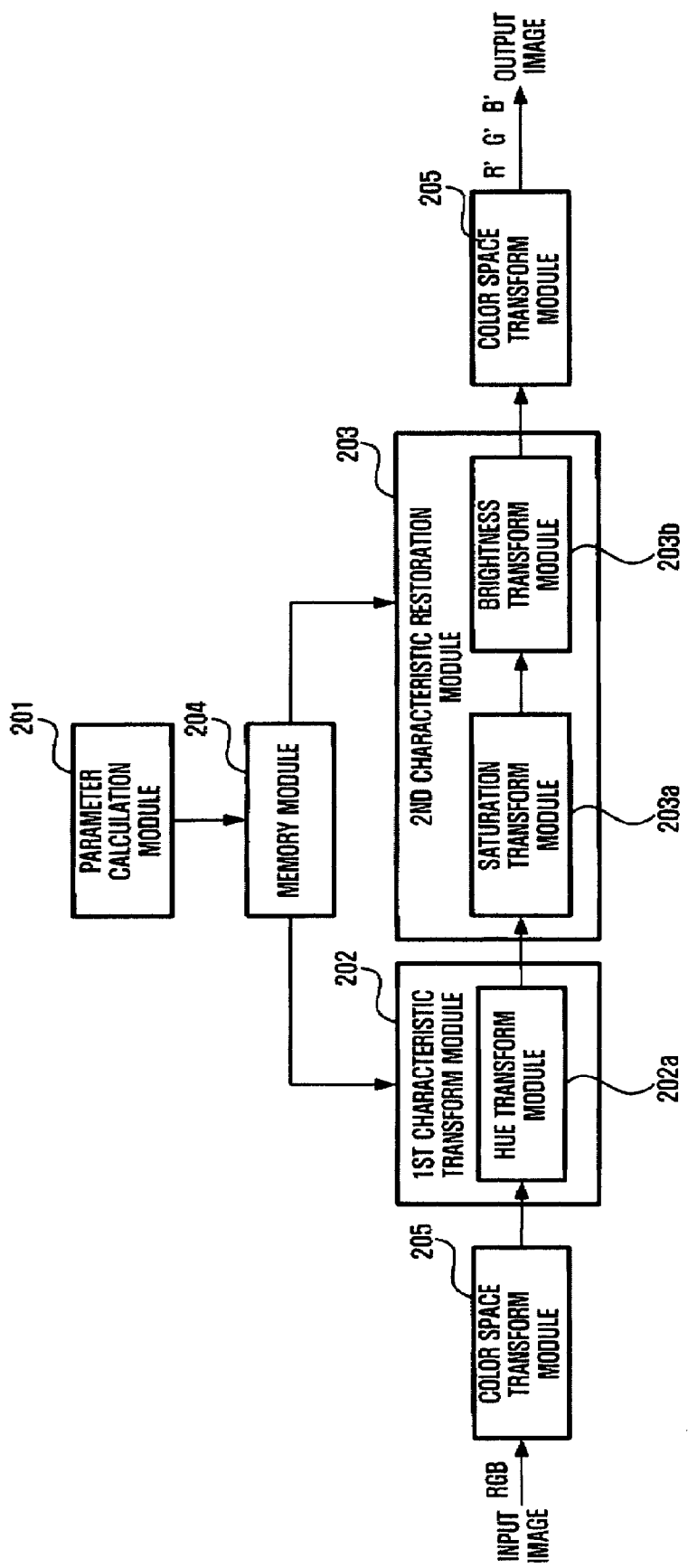
FIG. 2 is a block diagram illustrating a system correcting the color of a display image according to an embodiment of the present invention.

FIG. 2 illustrates a system correcting the hue of a display image according to an embodiment of the present invention.

The system 200 may include, for example, a parameter calculation module 201, a first characteristic transform module 202, a second characteristic restoration module 203, a memory module 204 and a color space transform module 205. The parameter calculation module 201 may calculate a plurality of parameters required for a transform or a correction based on a plurality of characteristic differences between a first image currently displayed and a second image, which is a target image of the first image, and may store the calculation result, e.g., in the memory module 204. The first characteristic transform module 202 may transform a first characteristic of the first image by using the plurality of calculated parameters. The second characteristic restoration module 203 may restore a second characteristic changed due to the transforming of the first characteristic. The memory module 205 may store parameters required for a transform, and the color space transform module 205 may transform a color space, noting that alternative embodiments are equally available.

In addition, the first characteristic transform module 202 may include, for example, a hue transform module 202A to perform a hue transform, while the second characteristic restoration module 203 may include, for example, a saturation transform module 203A and a brightness transform module 203B to perform transformation of saturation and brightness, respectively.

The hue transform module 202A may transform the hue component of the first image, using the parameters calculated in the parameter calculation module 201, and the saturation transform module 203A may increase or decrease the saturation component in a predetermined hue region in the first image, using the transform degree of the hue component and the calculated parameters.

The brightness transform module 203B may correct a change in brightness caused by the hue component change, using the maximum brightness information for each color, for example.

The parameter calculation module 201 may calculate a plurality of parameters required for a transform or a correction based on a plurality of characteristic differences between the first image currently displayed and the second image, which is a target image of the first image, and may store the calculation result in, e.g., in memory module 204.

Here, the plurality of characteristic differences may include one or more of tri-stimulus values of primary colors, red, green and blue, and white, or tone curve characteristics, e.g., gamma characteristics. In an embodiment, these characteristics may be directly measured by a user using a spectral radiometer or colorimeter, or may be identified using a monitor profile, for example.

For reference, in relation to the tri-stimulus value, when color and light are represented scientifically, they are represented as three functions of red, green and blue in order to match them with the sensitivity of human eyes, and the tri-stimulus values are determined based on color matching functions $x(\lambda)$, $y(\lambda)$, and $z(\lambda)$ having characteristics x, y, and z, respectively.

The meaning of the tri-stimulus value is the amount of each of red, green, and blue included in the colors of a light source or body. Below, the amounts are represented by capital letters, X, Y, and Z, respectively, and as set forth in Equation 1 below.

$X = K\int S(\lambda)\bar{x}(\lambda)A(\lambda)d\lambda$ $Y = K\int S(\lambda)\bar{y}(\lambda)A(\lambda)d\lambda$ $Z = K\int S(\lambda)\bar{z}(\lambda)A(\lambda)d\lambda$ \hfill Equation 1

Here, $S(\lambda)$ is the relative spectral distribution of an illuminating light, and $x(\lambda)$, $y(\lambda)$, and $z(\lambda)$ are color matching functions. $A(\lambda)$ is 1 for a light source, a reflection rate $R(\lambda)$ for a reflected color, and a transmission rate $T(\lambda)$ for a transparent color.

In addition, K is a proportional constant and may be expressed as equation 2 below.

$$K = \frac{100}{\int S(\lambda)\bar{y}(\lambda)d\lambda}$$ \hfill Equation 2

Accordingly, if the measured X value is relatively greater than other values (Y,Z), it may mean that the amount of the red component is greater in the measured color, if the Y value is relatively greater than other values, the amount of the green component may be greater, and if the Z value is relatively greater, the amount of the blue component may be greater.

In addition, the gamma characteristic may indicate the ratio of the output signal to an input signal when an image signal is converted from a light signal to an electrical signal or from an electrical signal to a light signal, and will be expressed herein as $\gamma$.

Usually, when $\gamma=1$, the input and output characteristic appears as a straight line, and if the value is greater than 1, the contrast increases, and if the value is less than 1, the contrast decreases, and the screen becomes indistinct.

Figure 3:
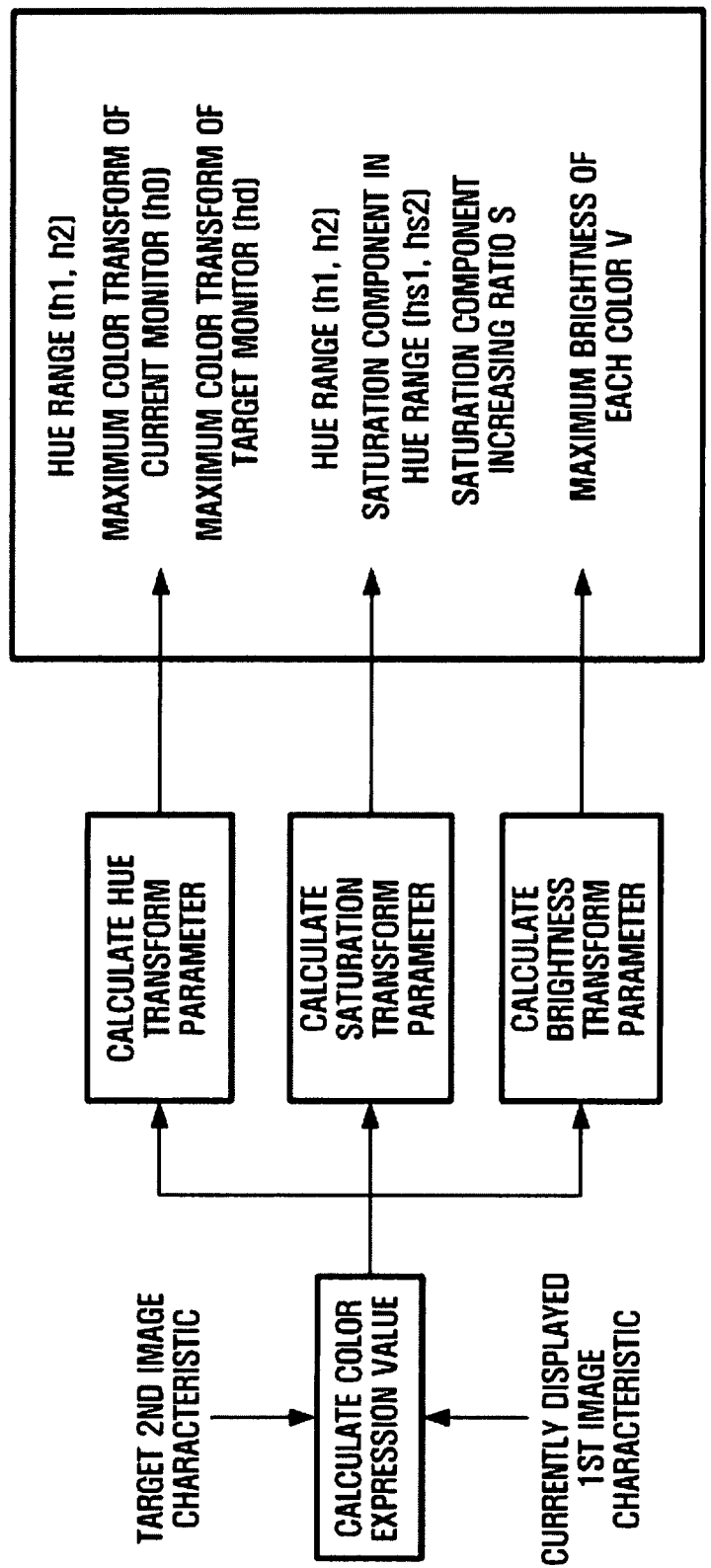
FIG. 3 illustrates a flow chart for a color transform parameter calculation module, such as that illustrated in FIG. 2, according to an embodiment of the present invention.

FIG. 3 illustrates the parameter calculation module 201, such as that illustrated in FIG. 2, according to an embodiment of the present invention.

Here, in an embodiment, the color transform parameter calculation module 201 may calculate the color (H), brightness (J), and saturation (C) of gamut boundary colors, using a plurality of characteristic differences between a first image currently being displayed and a second image, which is a target image of the first image, and a color appearance model such as CIECAM02, for example.

The color appearance model is a numerical model considering at least some factors related to a change in the surrounding environment of a person, which affect the color perception of the person when conventional 3-dimensional (3D) color data is processed. The CIECAM02 is an abbreviation of color appearance model 2002, developed as a CIE publication, and is an appearance model of colors, as published in 2004.

By using the CIECAM02, we can estimate how an object being monitored changes with respect to a monitoring condition such as an illuminating light or brightness. Brightness (Q), lightness (J), hue angle (h), hue component (H), chroma (C), saturation (S) can be identified as the estimation values.

Accordingly, in relation to the plurality of characteristic differences between a first image currently displayed and a second image, which is a target image of the first image, the parameter calculation module 201 may calculate color expression values, such as hue (H), lightness (J), and chroma (C), by comparing the characteristic differences with the color appearance model such as the CIECAM02. The resultant values may be used for calculation of parameters for transforming hue, saturation, and brightness.

In an embodiment, the parameters for performing a hue transform may include, for example, a hue range, the hue angle of a current monitor, and the hue angle of a target monitor, and the parameters for saturation include a hue range and a ratio indicating the degree of increasing saturation.

The parameters for a brightness transform may include maximum brightness for each color. Here it is again noted that, for one or more embodiments, each parameter described above may be stored, e.g., in the memory module 204 by the parameter calculation module 201.

Meanwhile, in one or more embodiments of the present invention, a hue transform may be performed in a color space including a hue component. In addition, for algorithm simplification, the hue transform may be performed in a device-dependent space, such as the HSV color model, rather than in a device-independent space, such as CIECAM02 or CIELAB.

In one or more embodiments of the present invention, for convenience of explanation, the HSV color model may be used as an example of the device-dependent space, but the device-dependent space is not limited to the HSV color model.

Figure 4:
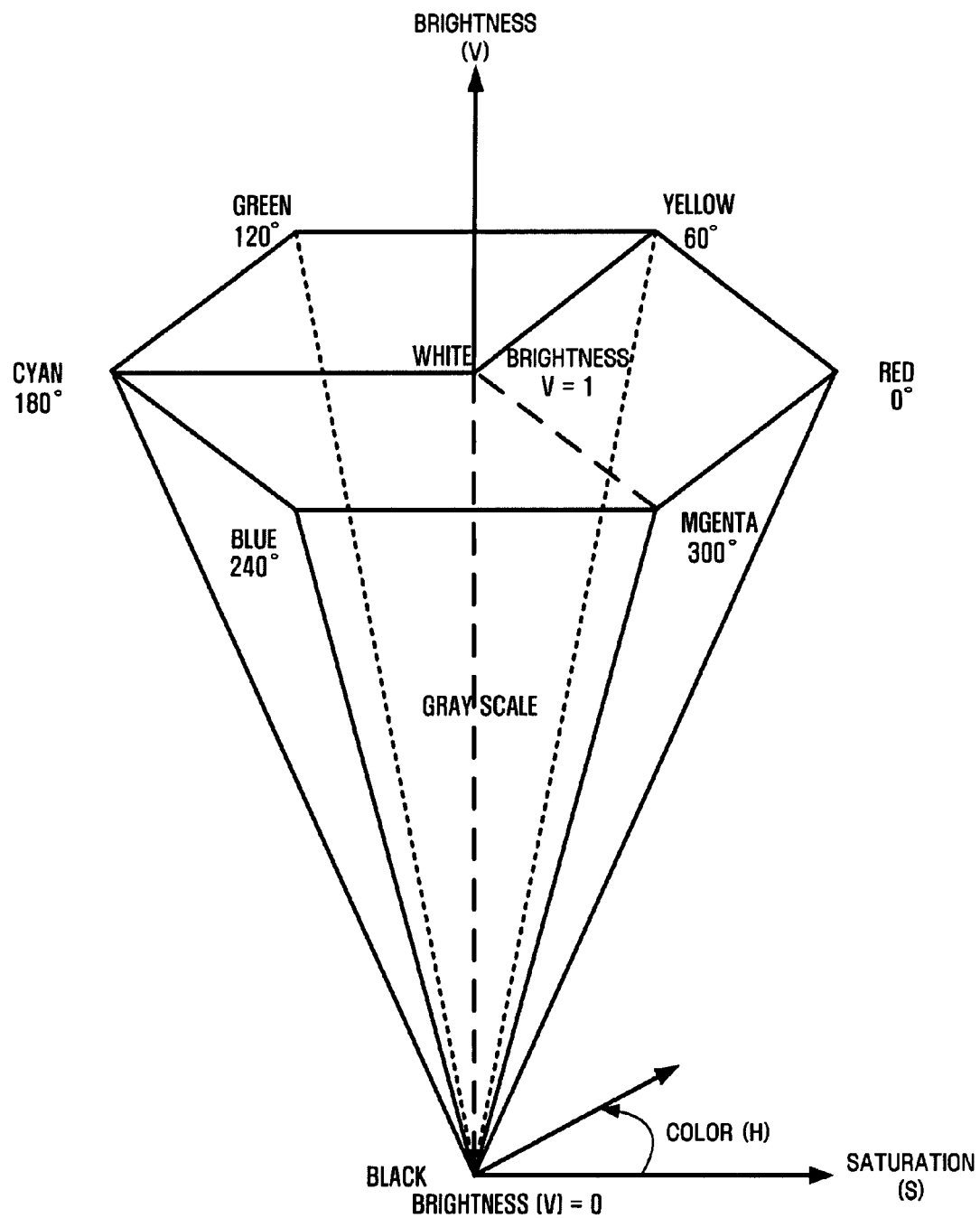
FIG. 4 illustrates a hue, saturation, and value (HSV) color model.

FIG. 4 illustrates an HSV color model.

The HSV color model is derived from a model in which the origin (0,0,0) of the RGB model illustrated in FIG. 1 is seen from a position of white (1,1,1). In the HSV color model, a color may be represented by a rotation angle indicating rotation about a vertical axis.

That is, a color may have a value from 1 to 360 degrees, and the complementary color of a predetermined color is positioned 180 degrees after or at the opposition side of the predetermined color. Accordingly, if 180 degrees are added to a current color value, the complementary value may be obtained.

Saturation is represented as a value from 0 to 1. As distance from the central axis decreases, the saturation approaches 0, and as the distance to the central axis increases, the saturation approaches 1.

For reference, saturation may be represented as 0~100% in most software programs.

Brightness may have a value from 0 to 1 (0%~100%) from the vertex of the hexagonal cone to the hexagonally shaped base. Accordingly, if V=1(100%), and S=1(100%), it indicates a pure color, and if V=1 (100%) and S=0(0%), it indicates white.

Figure 5A:
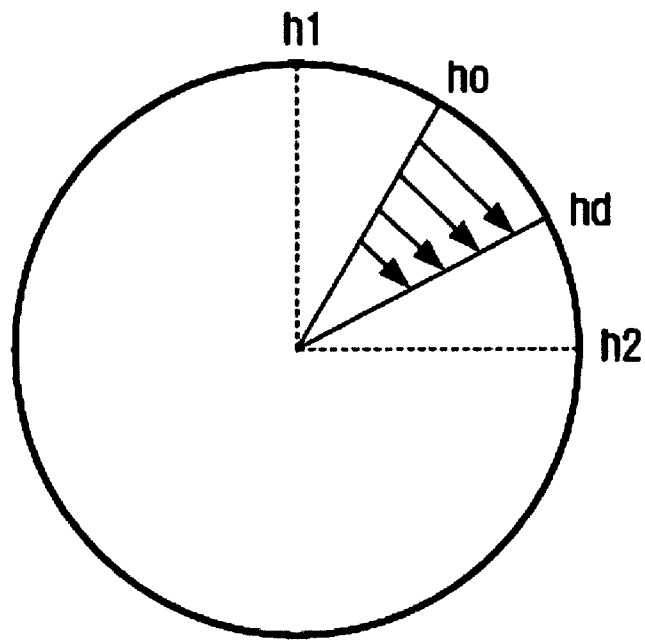
FIG. 5 illustrates the result of a color transform performed by a color transform module, such as that illustrated in FIG. 2, according to an embodiment of the present invention.
Figure 5B:
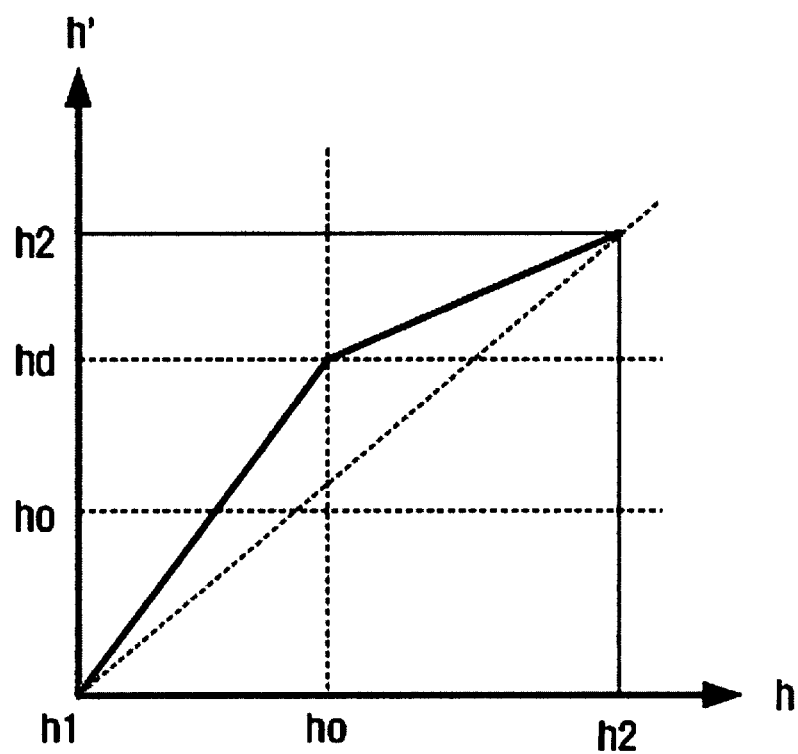

FIGS. 5A and 5B illustrate a result of a hue transform performed by the hue transform module 202A, such as that illustrated in FIG. 2, according to an embodiment of the present invention.

Using transform parameters stored, e.g., in the memory module 204, such as the hue range, the hue component of the first image, and the hue component of the second image, the hue transform module 202A may transform the hue component of the first image into a target hue.

Assuming that among the parameters stored in the memory module 204, the hue range is h1 (start of the range) and h2 (end of the range), the maximum hue component transform of the first image is ho, the maximum hue component transform of the second image is hd, an input hue component is h, and an output hue component is h', the output as hue component, that is, the transform degree of the as hue component, may be calculated as Equation 3 below, and it can be further seen from the graph illustrated in FIG. 5B that the hue component transform is linear.

$$\begin{cases} h' = h + \dfrac{(hd - ho)(h - h1)}{ho - h1} & h < ho \\ h' = h + \dfrac{(hd - ho)(h2 - h)}{h2 - ho} & h \geq ho \end{cases} \quad \text{Equation 3}$$

Figure 6A:
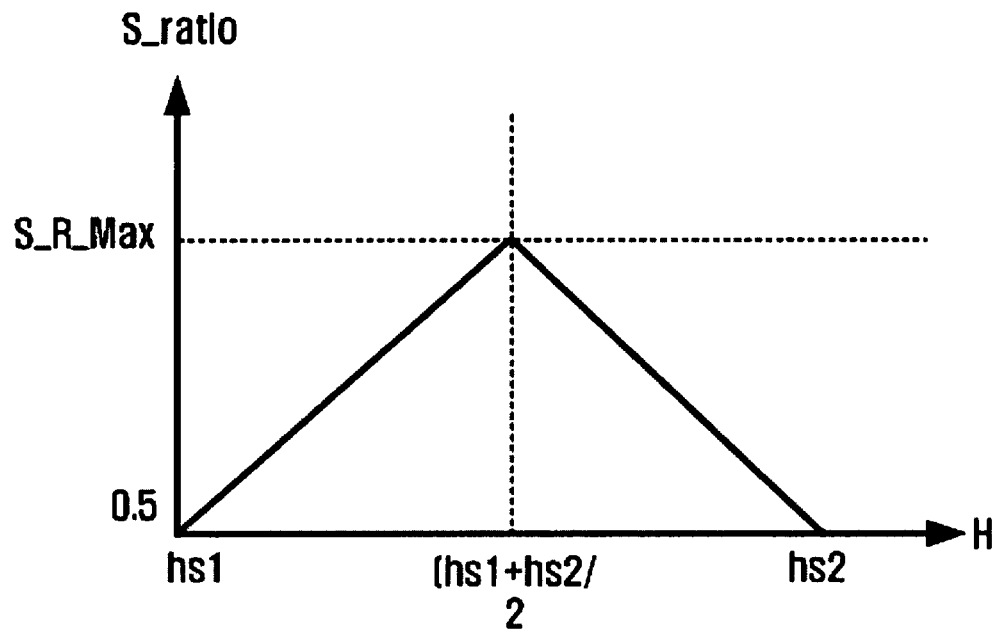
FIG. 6 illustrates a result of a saturation transform, such as performed by a saturation transform module illustrated in FIG. 2, according to an embodiment of the present invention.

FIG. 6A illustrates the result of a saturation transform performed by the saturation transform module 203A, illustrated in FIG. 2, according to an embodiment of the present invention.

By using the hue range and a saturation change ratio in the hue range stored in the memory module 204, the saturation transform module 203A may increase or decrease a saturation component in a predetermined hue range (area) of the current monitor.

Assuming that among the parameters stored in the memory module 204, the hue range is h1 and h2, the saturation component in the hue range is hs1 and hs2, the maximum increasing ratio of the saturation component is S_R_Max (default value is 1.5), and an input saturation component is S, an output saturation component S' indicating the degree of increase or decrease in the saturation component may be calculated using Equation 4 below.

$$\begin{cases} S\_Ratio = 0.5 + \dfrac{(S\_R\_Max - 0.5)(h - hs1)}{0.5(hs2 - hs1)} \\ \qquad h < \dfrac{hs2 + hs1}{2} \\ S\_Ratio = 0.5 + \dfrac{(S\_R\_Max - 0.5)(hs2 - h)}{0.5(hs2 - hs1)} \\ \qquad h \geq \dfrac{hs2 + hs1}{2} \end{cases} \quad \text{Equation 4}$$

$$\begin{cases} s' = s + 2s * (S\_Ratio - 0.5) & s < 0.5 \\ s' = s + 2(1 - s) * (S\_Ratio - 0.5) & s \geq 0.5 \end{cases}$$

Figure 6B:
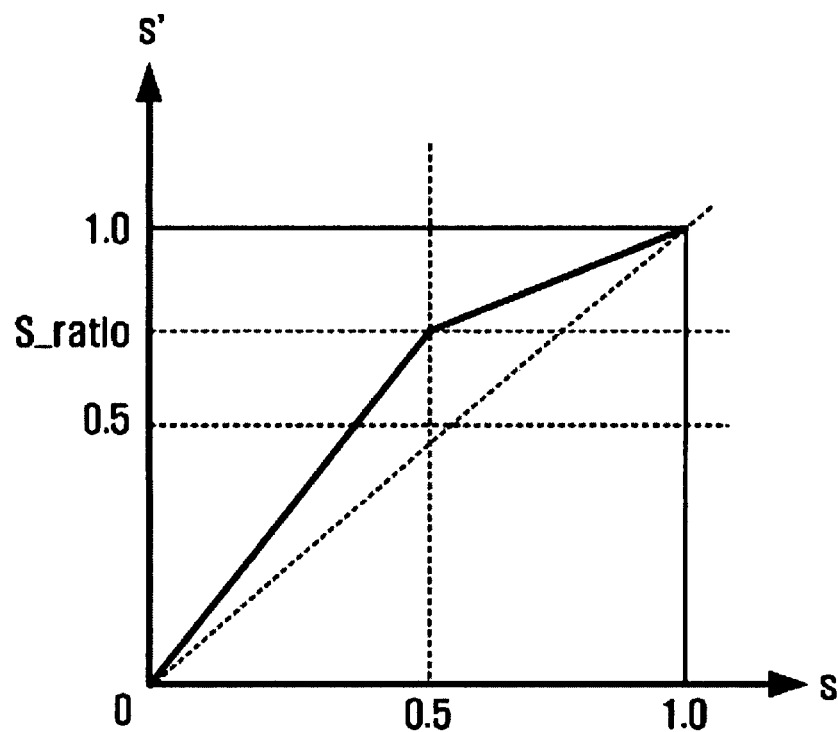

For reference, it can be further seen in the graph illustrated in FIG. 6B that the increase or decrease of the saturation component is linear. In addition, it can be seen in the graph illustrated in FIG. 6A that the maximum change of the saturation component is performed at a position of (hs1+hs2)/2.

Figure 7:
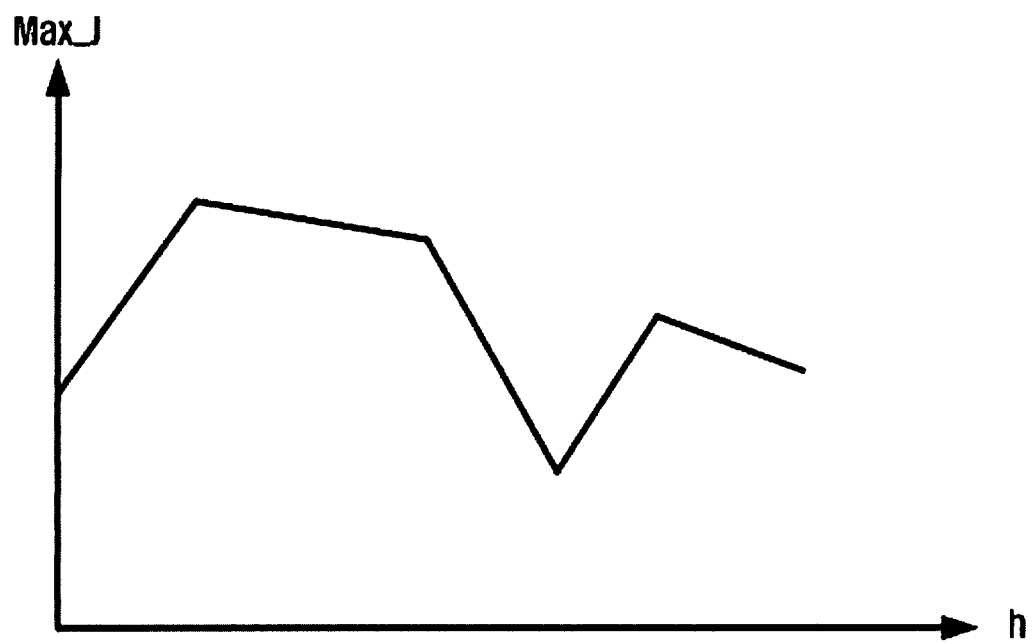
FIG. 7 illustrates a result of brightness correction by a brightness correction module illustrated in FIG. 2, according to an embodiment of the present invention.

FIG. 7 illustrates the result of brightness correction by the brightness transform module 203B, such as illustrated in FIG. 2, according to an embodiment of the present invention.

The brightness transform module 203B may correct a change in brightness caused by a change in a hue component, using the maximum brightness information for each color hue, for example.

Assuming that a correction ratio for correcting a change in brightness caused by a hue component transform is $J_{Ratio}$, the maximum brightness in an input hue component is max_J(h), the maximum brightness in an output hue component is max_J(h'), an input brightness is V, and an output brightness is V', the output brightness V' obtained by correcting the brightness changed by the hue component transform may be calculated using Equation 5 below.

Equation 5:

$$V' = V \cdot J_{Ratio} \qquad (5)$$

$$J_{Ratio} = \left( \dfrac{\max\_J(h)}{\max\_J(h')} \cdot \text{degree\_of\_Vrescaling} - 1.0 \right) \cdot s' + 1.0$$

$$0 \leq \text{degree\_of\_Vrescaling} \leq 1.0$$

For reference, the maximum brightness Max_J can be seen in FIG. 7.

Figure 8:
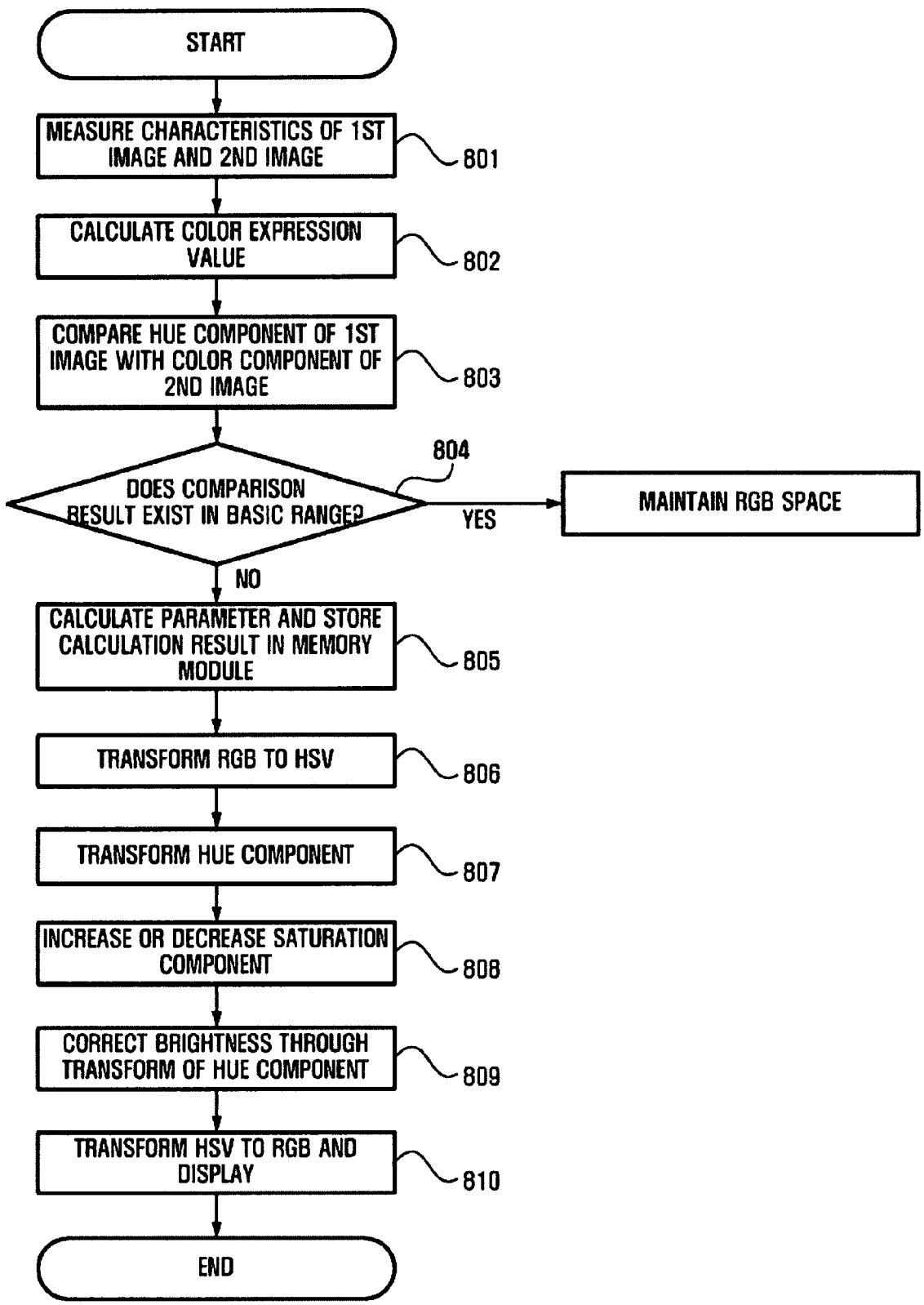
FIG. 8 illustrates a method of correcting a color of a display image, according to an embodiment of the present invention.

FIG. 8 is a flowchart of a method of correcting the color of a display image, according to an embodiment of the present invention.

In an embodiment of the present invention, characteristic of a first image currently being displayed and a plurality of characteristics of a second image that is a target image of the first image, may be measured by a user using a device such as a spectral radiometer or calorimeter, or using a monitor profile in operation 801.

In operation 802, a color expression value may be calculated, e.g., by the color transform parameter calculation module 201, using a color appearance model such as the CIECAM02 and the plurality of measured characteristic values.

In operation 803, the hue component of the first image currently displayed may be compared with the hue component of the second image that is the target image, among the color expression values calculated in operation 802, and it may be determined whether the comparison result is within a basic range in operation 804, e.g., by the parameter calculation module 201.

If the determination result in operation 804 indicates that the comparison result is within the basic range, hue transformation need not be performed, while if the comparison result is not within the basic range, parameters for hue transformation, saturation transformation and brightness correction may be calculated, e.g., by the parameter calculation module 201, and the calculation result stored, e.g., in the memory module 204, in operation 805.

In operation 806, the RGB color model may be transformed, e.g., by the color space transform module 205, into a device-dependent space, such as the HSV color model, rather than a device-independent space, such as the CIECAM02 or CIELAB.

For reference, the color transform in the device-dependent space may include a hue component. In one or more embodiments of the present invention, for convenience of explanation, the HSV color model may be used as an example of the device-dependent space, but the device-dependent space is not limited to the HSV color model, and alternative embodiments are equally available.

In operation 807, the hue component of the first image currently being displayed is transformed, e.g., by the hue transform module 202A, using the stored hue transform parameters, e.g., the parameters stored in the memory module 204.

In operation 808, the saturation component may be increased or decreased, e.g., by the saturation transform module 203A, in a predetermined hue range of the first image, using the degree of the transformed hue component and the saturation transform parameters such as those stored in the memory module 204 in operation 805.

In operation 809, a change in brightness caused by the hue component transform, may be corrected, e.g., by the brightness transform module 203B using the maximum brightness information for each hue such as those stored in the memory module 204.

The HSV color model may be transformed to the RGB color model and the final image in which the hue is transformed, that is, the second image may be displayed by, e.g. the color space transform module 205, in operation 810.

One or more embodiments of the present invention have been described herein with reference to block diagrams or flowchart illustrations of a system, method and medium correcting the color of a display image. Each block of the flowchart illustrations, and combinations of blocks in the flowchart illustrations may be implemented by computer program instructions. These computer program instructions may be provided to a processor, e.g., of a general purpose computer, special purpose computer, or other programmable data processing apparatus to produce a machine, such that the instructions, which execute via the processor of the computer or other programmable data processing apparatus, create techniques for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus implement the functions specified in the flowchart block or blocks.

In addition, each block may represent a module, segment, or portion of code, which include one or more executable instructions for implementing the specified logical function(s). In alternative implementations, the operations noted in the blocks may occur out of order or in different configuration of software and hardware. For example, two blocks shown in succession may in fact be executed substantially concurrently or the blocks may sometimes be executed in reverse order depending upon the functionality involved.

Further, the term 'module', as used herein, may mean, but is not limited to, a software or hardware component, such as a Field Programmable Gate Array (FPGA) or Application Specific Integrated Circuit (ASIC), which performs certain tasks. A module may be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Thus, in this regard it is further noted that in addition to this discussion, one or more embodiments of the present invention may also be implemented through such software as computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to one or more embodiments of the present invention. The media may also be a distributed network, so that the computer readable code is stored/transferred and executed in a distributed fashion. Still further, as only an example, the processing element may include a processor or a computer processor, and processing elements may be distributed and/or included in a single device.

Herein, depending on an embodiment, for reference, when a first image currently being displayed is changed in order to display a color similar to that of a second image that is a target color of the first image, the characteristic of any one or both of the saturation and brightness, and the characteristic of the color, may change together.

Further, when the brightness of the first image is changed in order to illuminate brightness similar to that of the second image, the characteristic of any one or both of the hue and saturation, and the characteristic of the brightness, may also change together, which leads to an undesired result.

Thus, in one or more embodiments of the present invention, it is assumed that in a first image being currently displayed, the characteristic of at least one of the hue, saturation and brightness that is desired to be changed in order to display an image similar to a second image is a first characteristic, and the remaining characteristics of the hue, saturation and brightness, excluding the first characteristic, are second characteristics.

That is, the second characteristic means a characteristic that has been changed undesirably due to the change of the first characteristic, and the one or more embodiments of the present invention provides a system, method and medium restoring the second characteristic.

For example, if the first characteristic to be changed is the hue, the second characteristic that should be restored is any one or both of the brightness and saturation changed by the hue change. If the first characteristic is the hue or saturation, the second characteristic to be restored is the brightness.

Accordingly, the first and second characteristics can vary without limitations with respect to a variety of embodiments, and in the present invention, it is further briefly noted that a case where the first characteristic is the hue, and the second characteristics are the saturation and brightness have been explained for convenience of explanation.

That is, in a case where the hue of a first image being currently displayed is changed in order to display a hue similar to that of a second image, at least one of the saturation and brightness is also changed.

The system, method and medium correcting the color of a display image as described above, have one or more of the following advantages.

The conventional display may be made to have a hue similar to that of a target display, while maintaining the maximum brightness and saturation of the conventional display. In this way, a natural image can be provided to the user.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus to correct a display image, comprising:
a parameter calculation unit to calculate, using one or more processors, a plurality of parameters required for a transform of a first image, based on a plurality of characteristic differences between the first image and a second image, into which the first image is to be transformed to visually match the second image;
a characteristic transform unit to transform a first characteristic of the first image using the plurality of calculated parameters, the transformation resulting in an unrelated change to a second characteristic of the first image; and
a characteristic restoration unit to restore the second characteristic changed by the transforming of the first characteristic to a value of the first image, previously held before the unrelated change,
wherein the first characteristic comprises a hue component and the second characteristic comprises at least one of a saturation component and a brightness component,
wherein each of the characteristic transform unit and the characteristic restoration unit comprises at least one of a hue transform function, a saturation transform function, and a brightness transform function,
wherein the parameters for brightness correction comprise a maximum brightness information for each hue, and
wherein the parameter calculation unit compares a hue component of the first image with a color component of the second image, determines whether a result of the comparison is within a basic range, and maintains an RGB space when the comparison result is within the basic range.

2. The apparatus of claim 1, wherein the characteristics comprise at least one of tri-stimulus values obtained from RGB primary colors and white, and a gamma characteristic.

3. The apparatus of claim 1, wherein the correction of the first image is performed in a color space including a hue component.

4. The apparatus of claim 3, wherein the color space is a device-dependent space.

5. The apparatus of claim 1, wherein the parameters for the hue transform comprise at least one of a hue range, the hue component of the first image, and the hue component of the second image.

6. The apparatus of claim 1, wherein the parameters for the saturation transform function comprise at least one of a hue range, and a saturation change ratio in the hue range.

7. A method of correcting a display image in an image processor, the method comprising:
calculating, using one or more processors, a plurality of parameters required for a transform of a first image, based on a plurality of characteristic differences between the first image and a second image, into which the first image is to be transformed to visually match the second image;
transforming a first characteristic of the first image using the plurality of calculated parameters, the transforming of the first characteristic resulting in an unrelated change to a second characteristic of the first image; and
restoring the second characteristic changed by the transforming of the first characteristic to a value of the first image, previously held before the unrelated change,
wherein the first characteristic comprises a hue component and the second characteristic comprises at least one of a saturation component and a brightness component,
wherein each of the transforming of the first characteristic and the restoring of the second characteristic comprises at least one of a hue transform function, a saturation transform function, and a brightness transform function,
wherein the parameters for brightness correction comprise a maximum brightness information for each hue, and
wherein the calculating includes comparing a hue component of the first image with a color component of the second image, determining whether a result of the comparison is within a basic range, and maintaining an RGB space when the comparison result is within the basic range.

8. The method of claim 7, wherein the plurality of characteristics comprise at least one of tri-stimulus values obtained from RGB primary colors and white, and a gamma characteristic.

9. The method of claim 7, wherein the correction is performed in a color space including a hue component.

10. The method of claim 9, wherein the color space is a device-dependent space.

11. The method of claim 7, wherein the parameters for the hue transform comprise at least one of a hue range, the hue component of the first image, and the hue component of the second image.

12. The method of claim 7, wherein the parameters for the saturation transform function comprise at least one of a hue range, and a saturation change ratio in the hue range.

* * * * *